(12) United States Patent
Rogers

(10) Patent No.: US 6,406,620 B1
(45) Date of Patent: Jun. 18, 2002

(54) RAINWATER FILTERS AND GULLIES

(76) Inventor: Colin Robert Rogers, c/o Barker Brettell Medina Chambers, Town Quay, Southampton (GB), S014 2AQ ( * ) Notice: Subject to any disclaimer, the term of this patent is extended or adjusted under 35 U.S.C. 154(b) by 0 days.

(21) Appl. No.: 09/687,890

(22) Filed: Oct. 13, 2000

(51) Int. Cl.$^7$ .................... E04D 13/076; E04D 13/08
(52) U.S. Cl. .................. 210/155; 210/162; 210/163; 210/170; 210/300; 210/460; 210/532.1; 52/12
(58) Field of Search ................. 210/155, 162, 210/163, 164, 170, 300, 307, 460, 474, 532.1; 52/12; 404/4, 5

(56) References Cited

U.S. PATENT DOCUMENTS

| | | | | |
|---|---|---|---|---|
| 527,580 A | * | 10/1894 | Barrett | 210/164 |
| 646,876 A | * | 4/1900 | Schreck | 210/300 |
| 1,123,705 A | * | 1/1915 | Dehn | 210/164 |
| 2,497,577 A | * | 2/1950 | Biggerstaff | 210/164 |
| 2,701,027 A | * | 2/1955 | Scoville | 210/163 |
| 4,801,377 A | * | 1/1989 | Bolt | 52/12 |
| 5,452,546 A | * | 9/1995 | Goddard | 210/170 |
| 5,849,181 A | * | 12/1998 | Monteith | 210/163 |
| 5,925,242 A | * | 7/1999 | McGhee | 210/164 |
| 5,980,740 A | * | 11/1999 | Harms et al. | 210/162 |
| 6,141,916 A | * | 11/2000 | Shackelford | 52/12 |
| 6,241,882 B1 | * | 6/2001 | Allard | 210/164 |

FOREIGN PATENT DOCUMENTS

| | | | |
|---|---|---|---|
| GB | 2327453 | * | 1/1999 |
| JP | 2-210129 | * | 8/1990 |

* cited by examiner

*Primary Examiner*—Christopher Upton
(74) *Attorney, Agent, or Firm*—Notaro & Michalos P.C.

(57) ABSTRACT

A rainwater filter assembly (1) comprises a housing provided with an inlet (9) and an outlet (3), the inlet is adapted to receive rainwater discharging from a downpipe (10), and in use the assembly (1) is located in series with an underground pipework (27), the housing defines a silt collection chamber (7) in which silt can settle from water passing from the inlet to the outlet, the entrance (23) to the outlet from the silt collection chamber being located above the base of the silt collection chamber, and the housing containing or supporting at least one filter (9) adapted to filter coarser material than silt from the rainwater.

Advantageously the filter assembly is capable of filtering coarse material from the water and provides a silt collection chamber so as to reduce the quantity of particulate material that passes to the pipework in the ground and to the soakaway normally connected to such pipework.

18 Claims, 7 Drawing Sheets

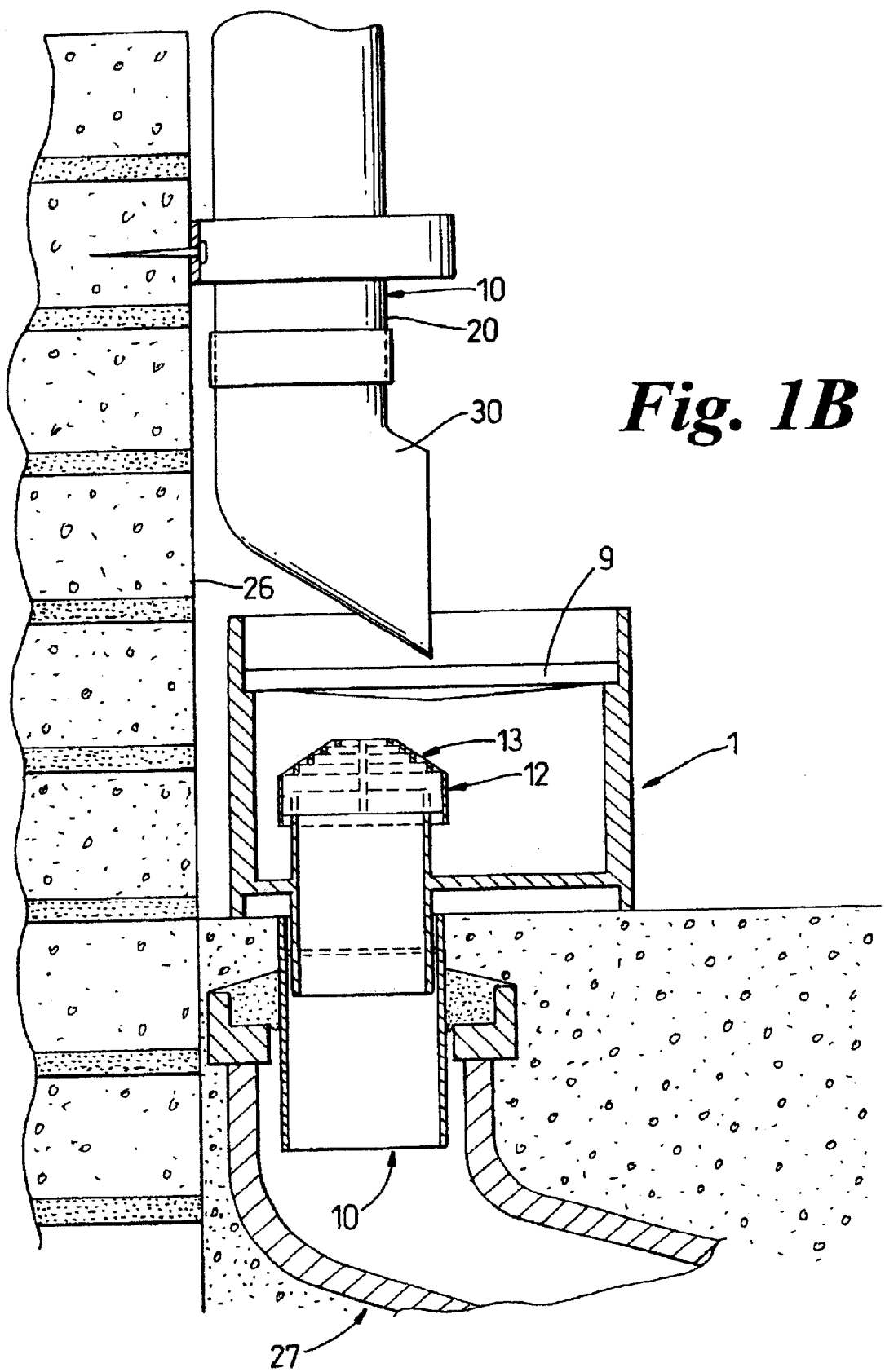

RAINWATER FILTERS AND GULLIES

The present invention relates primarily to a filter assembly adapted to filter rainwater flowing from a downpipe into an underground pipe, leading usually to a soakaway.

BACKGROUND OF THE INVENTION

Guttering systems, in the UK for example, consist of lengths of gutter attached to fascia boards, which then connect to downpipes. These in turn carry the water from the gutter to ground level.

All water from the downpipes should desirably lead to soakaways, such as are specified by UK Building Regulations, and not into foul drains or cesspits. It enters the soakaway by one of two methods.

1. A small percentage have a downpipe terminating above a gully with a grille on top which is part of an underground system leading to a soakaway which would have been installed when the house was built. This grille collects large debris which is easy to clear away but allows silt and small debris to enter the pipes leading to the soakaway which often eventually clogs/silts the system up completely. To repair this damage they have to be re-dug and re-piped. This system is superior to the following as it does have a grille to stop the large debris and does not become blocked as quickly as option 2.
2. The larger percentage of downpipes currently in use terminate directly into the clay or PVC underground pipe system leading to the soakaway. This means ALL debris and silt enters the underground pipe work, Therefore it all ends up in the underground pipe work and/or the soakaway often eventually clogging/silting the system up completely. To repair this damage they have to be re-dug and re-piped. Sometimes pipework can be cleared by hand-operated devices or by pressure devices, but it is time-consuming and can be expensive. Also, the downpipe needs to be removed and then replaced afterwards.

The only products on the market at present which are aimed at reducing these problems are not very effective. A mesh is available which fits on top of the gutter but this is not very attractive or effective as they do not fit very well and look unsightly. A plastic/wire mesh 'balloon' is available which fits in to the top of the downpipe in the running outlet. However, such balloons block very quickly, especially when rain falls after a long dry spell. The rain takes a lot of debris in a short space of time and is collected around the balloon which in turn becomes blocked up and the rain overflows over the top of the gutter. These need to be constantly cleared out which can he very awkward for a lot of people.

SUMMARIES OF THE INVENTION

According to one aspect of the present invention a rainwater filter assembly comprises a rainwater filter means comprising a housing and a filter assembly, said housing comprising an inlet for receiving rainwater discharging from a downpipe, an outlet for connection in series with an underground pipework, and housing walls defining a silt collection chamber in the flow path between said inlet and said outlet, whereby silt settles in said silt collection chamber from rainwater passing from said inlet to said outlet, said housing walls comprising a silt collection chamber base, and said filter means being supported by said housing for filtering coarser material than silt from rainwater which passes from said inlet to said outlet, said outlet comprising an outlet entrance positioned higher than said base, for allowing rainwater to pass from said silt collection chamber to said outlet.

Thus the filter assembly is capable of filtering coarse material from the water and provides a silt collection chamber so as to reduce the quantity of particulate material that passes to the pipework in the ground and to the soakaway normally connected to such pipework.

Preferably the assembly is provided with a downwardly projecting tubular outlet. The tubular outlet may be connected to a pipe in the ground.

The assembly may be provided with locating means which is operative to ensure that the outlet is positioned so as to discharge into the underground pipework.

The locating means may be provided with an aperture, the aperture being suitably sized so as to receive the tubular outlet.

The tubular outlet is preferably sized to be received within the upper end of a residual piece of downpipe that is left after removal of a short portion of the existing downpipe just above the ground. Downpipes come in a range of standard sizes, and some are round and others square, but a tubular outlet of typically 56 mm outside diameter can be received within most such pipes.

Downpipes are typically made of cast iron, aluminium, asbestos or PVC and are generally secured in an underground pipe collar with mortar, and this joint is best left intact, so the ability of a 56 mm tubular outlet to fit most existing downpipes is advantageous.

When the filter assembly is to be fitted to an existing installation in which a downpipe connects at ground level with an underground pipe leading to a soakaway, a portion of the downpipe is removed by cutting through the downpipe, at or adjacent to ground level, preferably leaving a short section of downpipe connected to the underground pipework. The filter assembly can then be mounted in position by cutting the tubular outlet to size and inserting the tubular outlet of the assembly into the short remaining section of downpipe.

Advantageously an O-ring may be fitted between the outlet and the remaining portion of downpipe to provide a snug fit, even when the downpipe is of square section.

The filter means preferably comprises first and second filters positioned in series with each other in the flow path of at least the bulk of water flowing from the inlet to the outlet.

The first filter is preferably in the form of a relatively coarse grating which preferably extends across substantially the full width of the upper end of the housing which is otherwise substantially open.

The downpipe which discharges into the upper end of the filter housing may be provided with a downpipe shoe, or the lower end of the downpipe may be cut at an angle, to produce a controlled discharge of water onto the first filter.

The second filter is preferably in the form of a relatively fine grating sized to collect floating debris which is of intermediate size to that of silt particles and large particulate debris such as leaves, moss and twigs which will be collected by the first filter.

The apertures in the second filter are preferably sized to collect small floating debris such as beech mast or blossom.

A guard is preferably provided to prevent water discharging from the downpipe from impinging directly on the entrance to the tubular outlet.

The guard is preferably in the form of a plate integral with the first filter so as to form an unapertured portion of the first filter.

The second filter is preferably located at or adjacent to the entrance to the tubular outlet, which it will be recalled is above the base of the silt collection chamber. Water will overflow from the silt collection chamber into the tubular outlet, so that any fine floating debris will tend to be at about the level of said entrance, and locating the second filter in this region is advantageous.

The second filter is preferably a grid of substantially dome shape which is adapted to extend over the outlet entrance.

Bypass means is preferably provided to enable some of the water flowing from the silt collection chamber to pass to the outlet entrance without passing through the mesh of the second filter. Providing that this water is not taken from the surface of the water flowing through the silt collection chamber then that water will not generally contain much fine floatable material.

The bypass means may comprise an annular passage defined radially between a downwardly directed skirt on the second filter, and the outer surface of the upper end of the outlet.

Thus when the second filter is of domed shape, the dome preferably carries a depending unapertured skirt.

The first and second filters are preferably removable from the housing for cleaning purposes, and indeed the housing itself is preferably easily removable simply by unplugging the outlet from the residual portion of downpipe left in the ground, to enable silt and debris to be cleaned from the collection chamber.

The outlet is preferably positioned eccentric to the housing outer walls to enable the axis of the housing to be adjusted horizontally in position for accommodating any misalignments of the axis of the downpipe and the axis of the upper end of the underground pipework with which the outlet is to connect.

A second aspect of the invention comprises a downpipe and underground pipework installation in which a rainwater filter assembly in accordance with the first aspect of the invention has been fitted so as to receive rainwater from the downpipe and to filter the water before it passes to the underground pipework According to a third aspect of the invention a rainwater gully comprises a housing for positioning above ground level, said housing comprising an inlet, a housing upper end and a downwardly projecting tubular outlet, said inlet extending substantially across the full width of the upper end of the housing for receiving rainwater discharging from a downpipe, the downwardly projecting tubular outlet being couplable with a substantially vertical pipe extending below ground level, and said outlet being positioned eccentric to said housing upper end.

We are aware from searches of the existence of specification no. GB 2327453A entitled 'Liquid re-channelling device'. Although the structure of that device has a superficial resemblance to that of the applicant's invention, the re-channelling device comprises a pipe attachment means for connecting a re-channelling pipe to the housing. The present invention is not concerned with the provision of a pipe attachment means.

BRIEF DESCRIPTION OF THE DRAWINGS

A filter assembly in accordance with the invention will now be described, by way of example only, with reference to the accompanying drawings, in which:

FIG. 1B is a view similar to FIG. 1A but showing a downpipe located closer to the building wall than in FIG. 1A and being fitted with a downpipe shoe.

DETAILED DESCRIPTION OF PREFERRED EMBODIMENTS

Figure 1A:
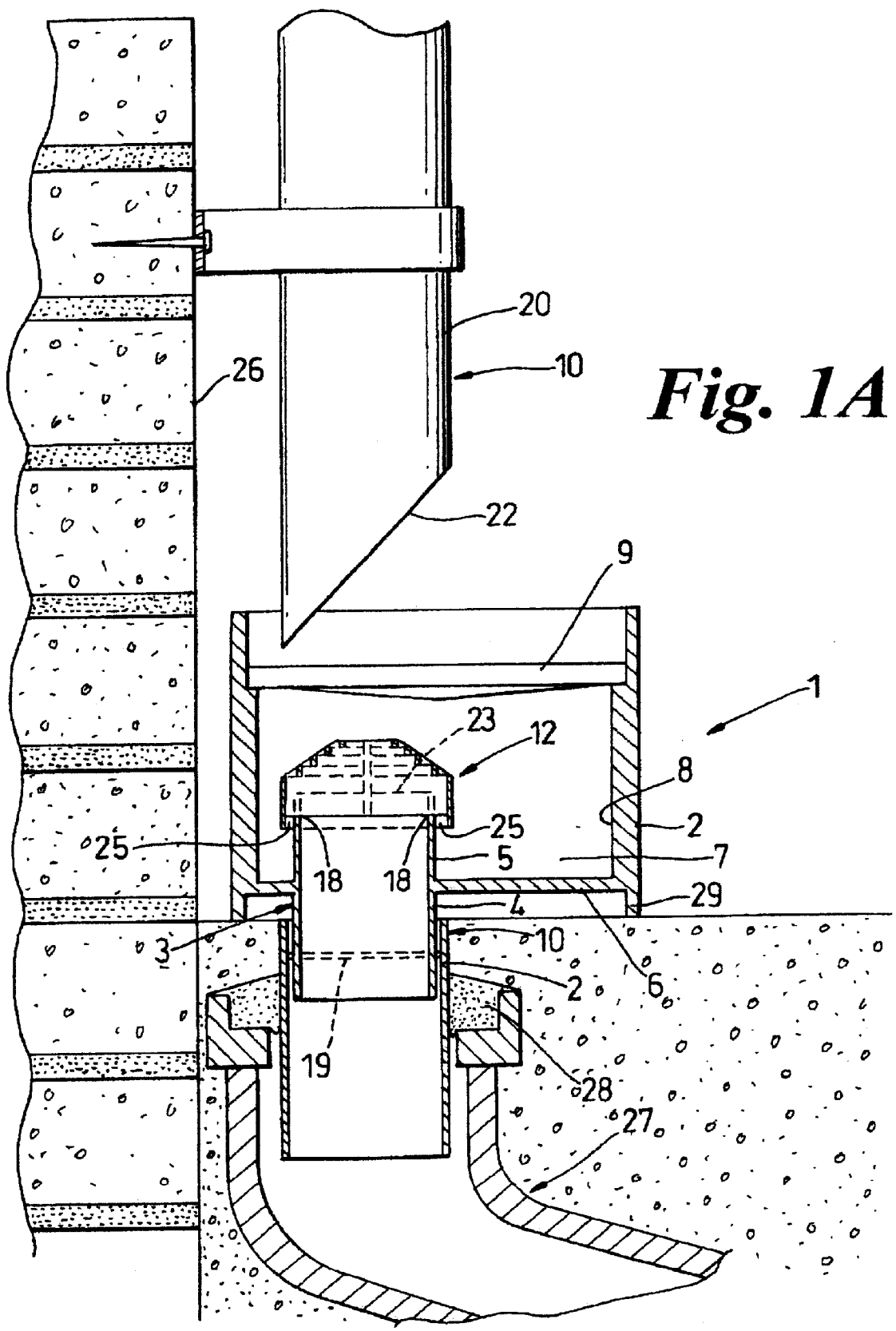
FIG. 1A is a schematic vertical cross-section of a building, downpipe and underground pipe fitted with a filter assembly in accordance with the invention.
Figure 2:
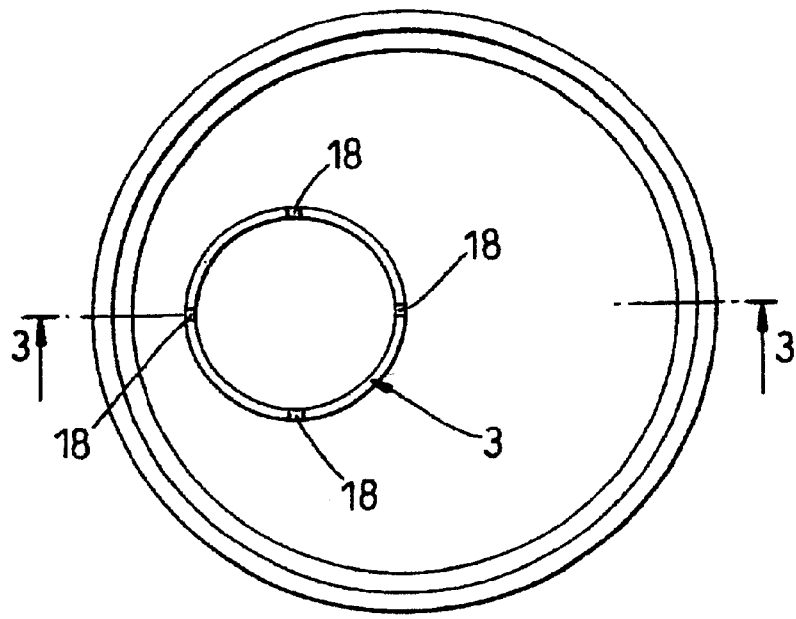
FIG. 2 is a plan view of the housing of the filter assembly.
Figure 3:
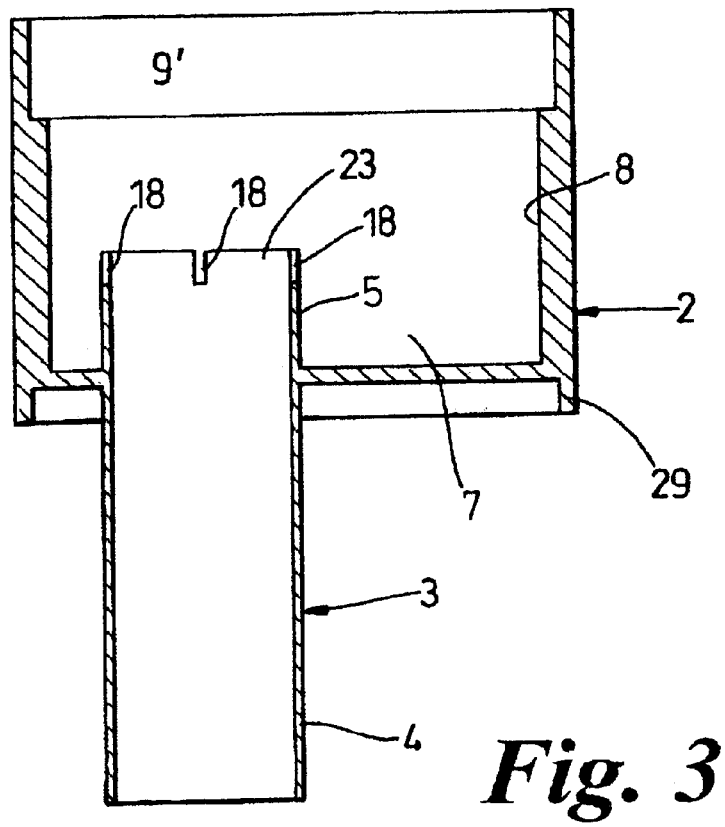
FIG. 3 is a vertical cross-section of the housing taken on the line 3—3 of FIG. 2.

The illustrated filter assembly 1 comprises a moulded plastics open-topped cylindrical housing 2 provided with a tubular outlet 3 comprising. contiguous downwardly projecting portion 4 and a portion 5 upstanding from the flat base 6 of the housing. A silt collection chamber 7 is bounded in the lower part of the interior of housing 2 by silt collection chamber base 6 the inner vertical wall 8 of the housing, and by the radially outer vertical wall of upstanding outlet portion 5.

Figure 4:
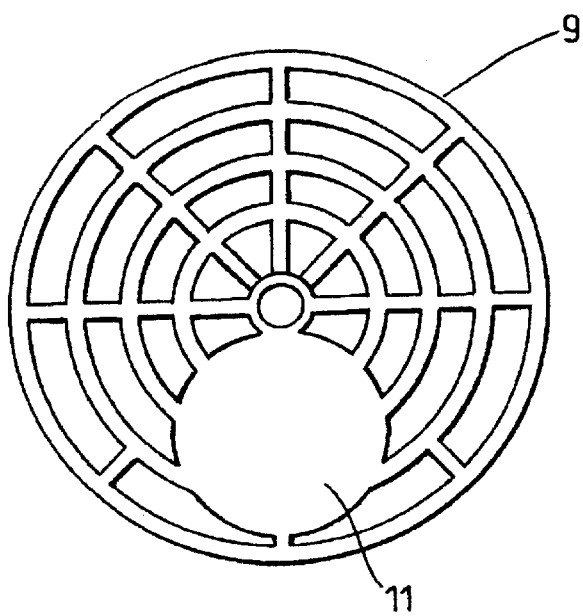
FIG. 4 is a plan view of a primary filter disc of the filter assembly,.
Figure 5:
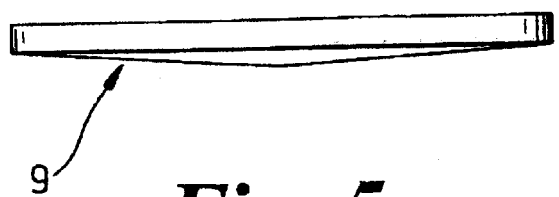
FIG. 5 is a side elevation of the disc of FIG. 4.

A primary filter for coarse items discharged with rainwater from main downpipe portion 10 is in the form of a dished disc 9, shown in FIGS. 4 and 5. Such coarse items are, for example, sticks, leaves and moss carried from the main roof or from guttering. The dimensions of the slots in the disc 9 are sufficiently narrow to prevent passage of such relatively large material, but are not fine enough to trap finer material, such as silt and floating beech mast or blossom.

As shown in FIG. 4, the disc 9 incorporates a circular blanking or guard portion 11 which is positioned, in register with the outlet 3 to prevent water being directed straight towards the outlet 3 by the downpipe 10. Disc 9 seats on an annular shoulder 9' provided in the upper part of housing 2, and can be fitted either way up as desired.

Figure 6:
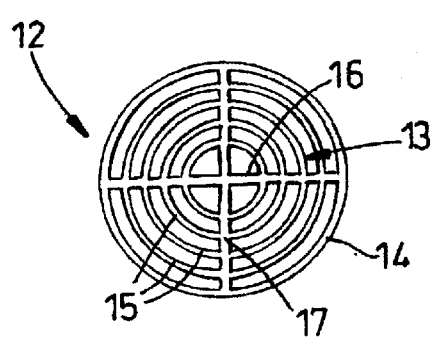
FIG. 6 is a plan view of the secondary filter.
Figure 7:
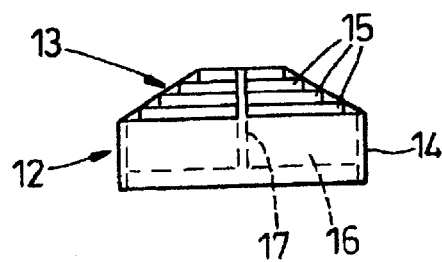
FIG. 7 is a side elevation of the secondary filter of FIG. 6.

A second filter 12, as shown in FIGS. 6 and 7, comprises a moulded plastics domed grid 13 integral with a cylindrical skirt 14. The domed grid 13 comprises a series of co-axial annular grid rings 15 interconnected by a pair of crossed vertical vanes 16, 17, the rings being arranged with the smallest rings uppermost.

Figure 9:
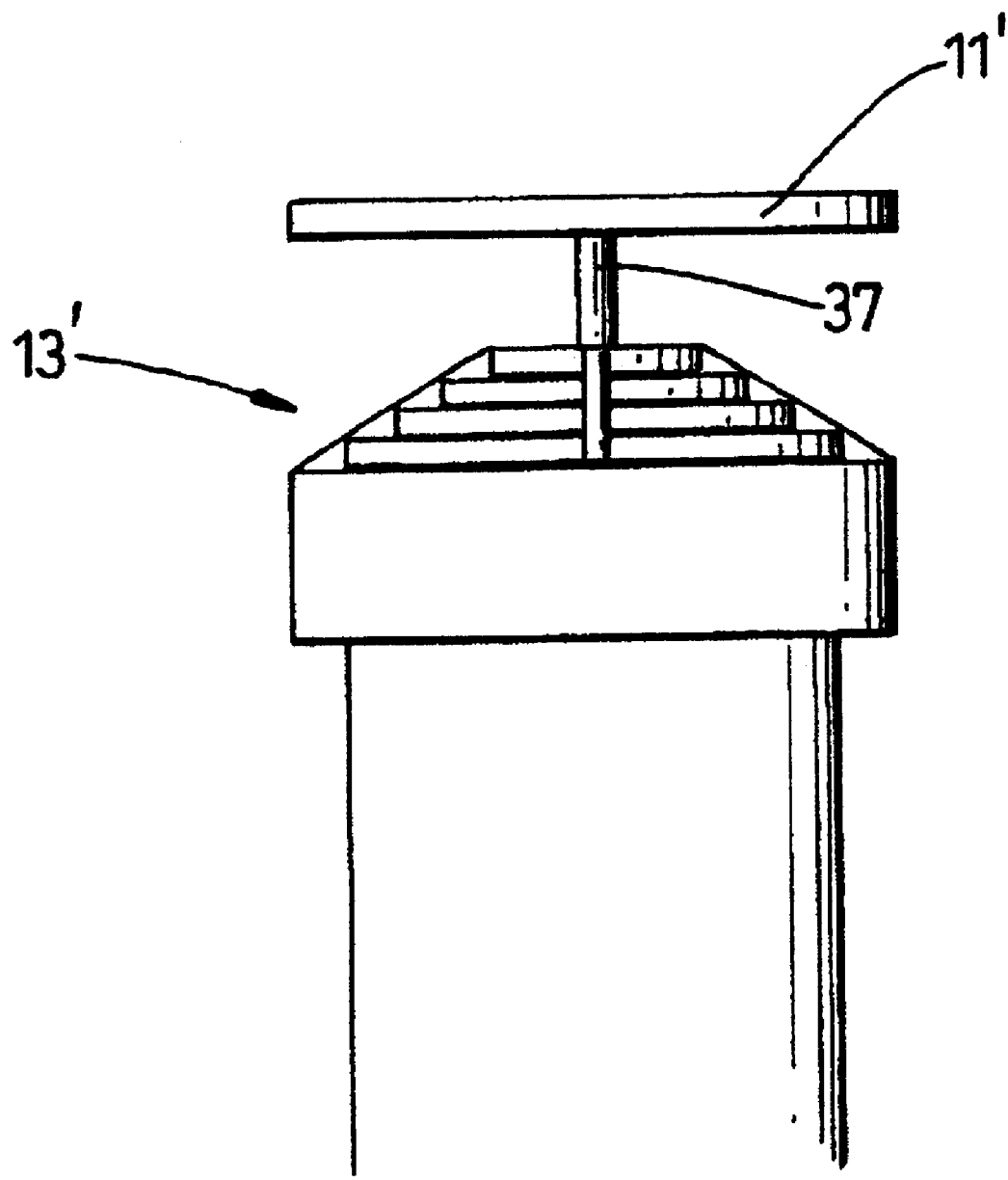
FIG. 9 shows an alternative embodiment of the second filter.

The guard portion 11 need not necessarily be provided in the disc 9. A guard portion may be provided anywhere directly above the outlet 3, as for example shown in FIG. 9. A circular guard portion 11' is provided on a stem 37, the stem 37 being so dimensioned as to locate into a recess (not shown) provided in the top of a domed grid 13'.

The crossed vanes 16, 17 locate in four equi-angularly spaced cut-outs 18 provided in the upper end of outlet portion 5 to retain the second filter 12 as a push fit on the outlet tube.

The second filter 12 has a relatively narrow spacing between the grid bars, approximately one third of that of the corresponding spacing of the bars of the first filter 9. This spacing is narrow enough to prevent most small floating organic items, such as beech mast or blossom, to pass through.

With reference to FIG. 1, the filter assembly 1 has been fitted to an existing installation of downpipe by cutting away a portion of the downpipe 10 to leave an upper discharge portion 20 and a lower portion 21 secured by mortar 28 in the upper end of an underground pipe 27. It will be appreciated, however, that the upper discharge portion 20 need not necessarily be used and that part of the downpipe 10 could of course be substituted for a replacement upper discharge portion. A sufficient length of downpipe has been removed, and the length of outlet pipe 4 has been trimmed, to enable the filter assembly to be fitted by inserting the outlet portion 4 into the upper end of the residual downpipe portion 21. An O-ring 19 is fitted between the downwardly projecting portion 4 and the lower portion 21 to provide a snug fit.

Conveniently the upper end of the residual downpipe portion 21 is arranged to be substantially at ground level, to enable a peripheral skirt 29 to rest on the ground. If the ground is sloping, skirt 29 may be trimmed if desired.

The lower end 22 of the upper downpipe portion 20 has been cut at an angle in FIG. 1A to assist in providing a steady flow of water into the upper end of housing 2.

It will be appreciated that water entering the housing will fill the chamber 7 which will then overflow through the second filter 12 into the upper end 23 of outlet 3, and most floating material that has negotiated the filter disc 9 will be trapped on the exterior of the domed portion of the filter 12. The dome shape of filter 12 helps to prevent filter 12 from becoming quickly clogged with excessive material since initial clogging of the lower part of the filter will cause the water level to rise to reach a fresh portion of the filter 12.

A bypass to the second filter 12 is provided by the annular space 25 defined radially between skirt 14 and the upper end of outlet portion 5, but since the entrance to annular space 25 is below the level of the water in chamber 7, little floating material should pass upwards through space 25. This bypass does, however, help to allow a large rate of flow of water through the filter assembly when required.

Silt collects on the base 6 in chamber 7 due to the reduced average velocity of fluid in chamber 7, due to the relatively large dimensions of chamber 7 compared with the transverse dimensions of the downpipe.

Thus the filter assembly 1 is effective to capture most materials carried by water flowing from a downpipe to an underground pipe normally leading to a soakaway.

The eccentric positioning of outlet 3 accommodates any offset between the downpipe stub 21 left in the ground and the downpipe portion 20, as is often found to be present. More importantly, in new installations of downpipe the distance of the downpipe from the wall 26 varies according to the type of downpipe wall brackets used. As shown in FIG. 1B, some brackets mount the downpipe closer to the wall than those shown in FIG. 1A, and the eccentric positioning of outlet 3 can accommodate the misalignment of the downpipe stub 21 with the downpipe portion 20. A downpipe shoe 30 may be employed on the downpipe 20.

However, a pre-existing drainage arrangement may comprise a downpipe which discharges rainwater onto a gully grid or grill which is located below the downpipe outlet. The gully grid or grill generally sits at the mouth of the underground pipework. One way of installing the inventive filter assembly 1 to such an existing drainage arrangement is shown in FIGS. 8a and 8b.

As can be seen the pre-existing gully grid has been replaced by an appropriately sized plate 31 of square outline. The plate 31 sits on a supporting lip 33 which extends around the inside of the upper end of the underground pipe 32 or underground gully (as shown in FIG. 8b). The plate 31 is provided with an aperture 35 which is suitably sized so as to receive the tubular outlet 3.

Figure 8A:
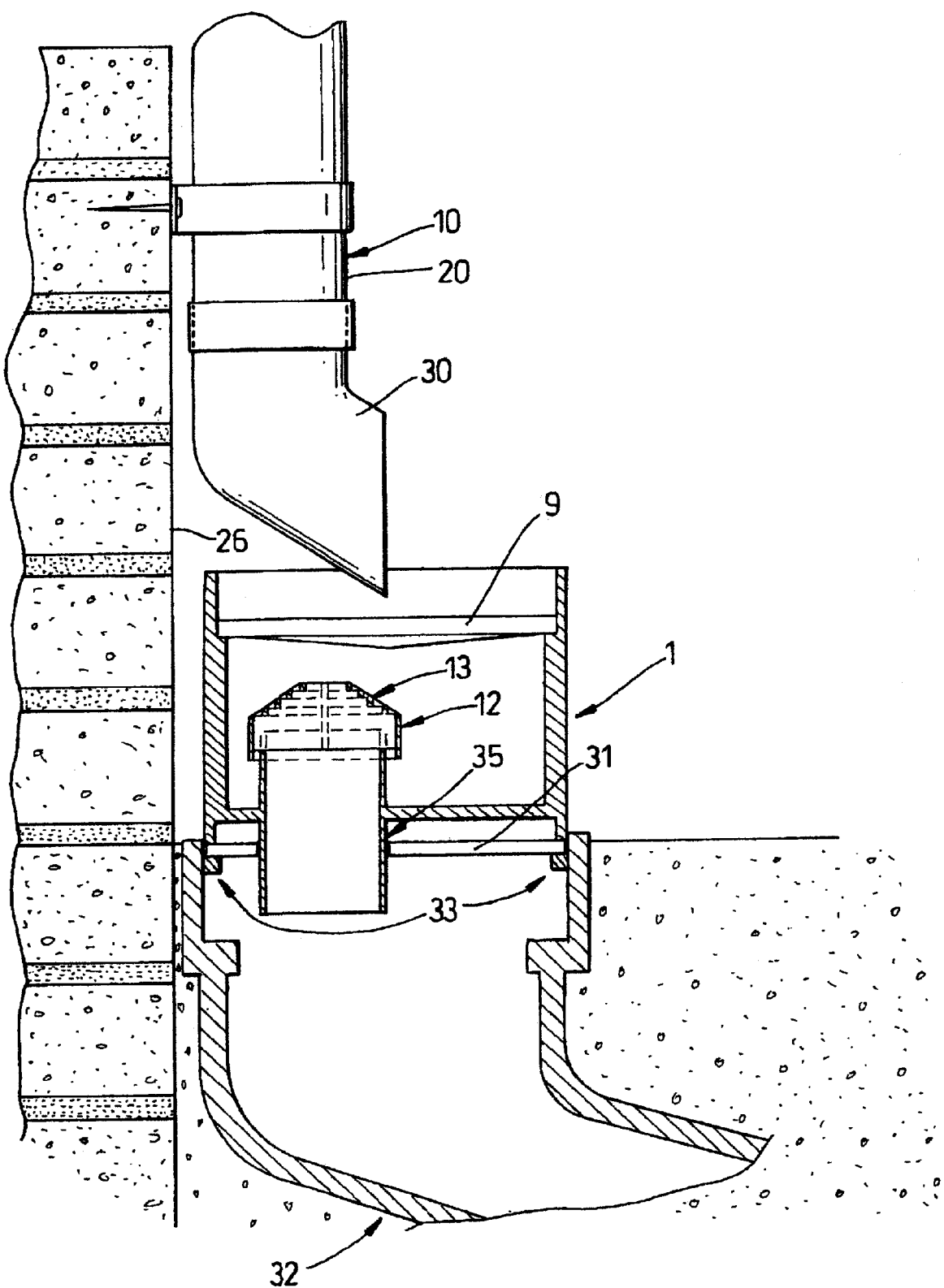
FIGS. 8a and 8b are schematic vertical cross-sections of a building, downpipe and underground pipe fitted with a filter assembly in accordance with the invention in which the inventive filter assembly has been installed in an alternative manner.
Figure 8B:
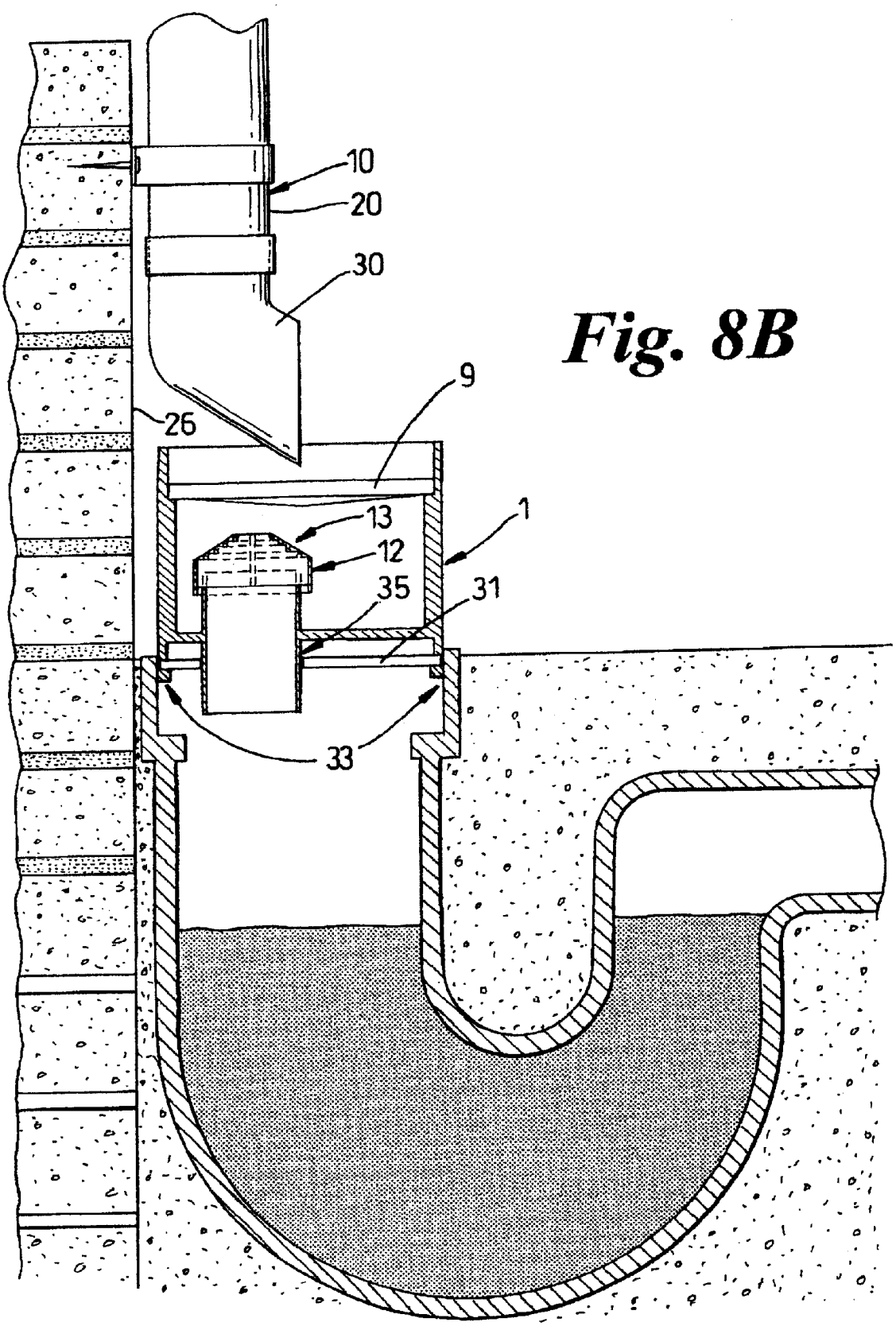

The plate 31 serves to locate the tubular outlet 3 free end to discharge into the underground pipe 32, as shown in FIGS. 8A & 8B.

The filter assembly 1 may be provided with a cover (not illustrated) which is adapted to be located on the top of the assembly so as to retain any water which splashes up off the disc 9.

In a modification of the illustrated unit, in accordance with the third aspect of the invention, and which may simply be used as a rainwater gully to provide the eccentric adjustment feature just described and having the ability to connect to most conventional sizes of downpipe, there may be no filters and there need not necessarily be a silt trap. However, the provision of a silt trap and filters is very desirable.

What is claimed is:

1. A rainwater filter assembly comprising a housing and a filter means for positioning below a downpipe shoe, said housing comprising an inlet for receiving rainwater discharging from a downpipe, an outlet for connection in series with an underground pipework, and housing walls defining a silt collection chamber in the flow path between said inlet and said outlet, whereby silt settles in said silt collection chamber from rainwater passing from said inlet to said outlet, said housing walls comprising a silt collection chamber base, and said filter means being supported by said housing for filtering coarser material than silt from rainwater which passes from said inlet to said outlet, said outlet comprising an outlet entrance positioned higher than said base, for allowing rainwater to pass from said silt collection chamber to said outlet, the filter means comprising first and second filters positioned in series with each other in said flow path, and further comprising a second filter bypass means for enabling some excess water flowing from said silt collection chamber to pass to said outlet entrance without passing through said second filter, the second filter comprising a downwardly directed skirt coaxial with said outlet entrance, and said outlet comprising an outer surface coaxial with said outlet entrance, said second filter bypass means comprising an annular passage defined radially between said downwardly directed skirt and said outlet outer surface.

2. A rainwater filter assembly as claimed in claim 1, wherein said outlet is a downwardly projecting tubular outlet.

3. A rainwater filter assembly as claimed in claim 2, where said tubular outlet is connected to a pipe in the ground.

4. A rainwater filter assembly as claimed in claim 1, wherein said outlet comprises a free end portion, and the assembly comprises outlet locating means which is operative so that, in use, the free end portion is positioned to discharge into said underground pipework.

5. A rainwater filter assembly as claimed in claim 4, wherein said locating means is provided with an aperture, the aperture being suitably sized to receive said free end portion of said tubular outlet.

6. A rainwater filter assembly as claimed in claim 1, wherein said housing comprises a substantially open upper housing end defining said inlet, and said first filter is in the form of a relatively coarse grating which extends across substantially the full width of said upper housing end.

7. A rainwater filter assembly as claimed in claim 1, wherein said second filter is in the form of a relatively fine grating sized to collect floating debris which is of intermediate size to that of silt particles and large particulate debris such as leaves, moss and twigs which are collected by said first filter.

8. A rainwater filter assembly as claimed in claim 1, further comprising a guard sized and positioned to prevent water discharging from the downpipe from impinging directly on said outlet entrance.

9. A rainwater filter assembly as claimed in claim 8, wherein said guard is in the form of a plate integral with first filter and forming an unapertured portion of said first filter.

10. A rainwater filter assembly as claimed in claim 1, wherein said second filter is located proximate to said outlet entrance.

11. A rainwater filter assembly as claimed in claim 1, wherein said second filter is a grid of dome shape which extends over said outlet entrance.

12. A rainwater filter assembly as claimed in claim 1, wherein the first and second filters are removable from said housing for cleaning purposes.

13. A rainwater filter assembly as claimed in claim 1, wherein said housing walls comprise outer housing walls, and said outlet is positioned eccentric to said outer housing walls to enable the vertical axis of the housing to be adjusted horizontally in position for accommodating a misalignment of the axis of the downpipe and the axis of the upper end of the underground pipework with which the outlet is to connect.

14. A rainwater installation for a building comprising:
   a downpipe for channeling water from the building, the downpipe having a lower end;
   a rainwater filter assembly positioned below the downpipe lower end, the rainwater filter assembly comprising a housing, and a filter means for positioning below the downpipe, said housing comprising an inlet for receiving rainwater discharging from the downpipe lower end, an outlet for connection in series with an underground pipework, and housing walls defining a silt collection chamber in the flow path between said inlet and said outlet, whereby silt settles in said silt collection chamber from rainwater passing from said inlet to said outlet, said housing walls comprising a silt collection chamber base, and said filter means being supported by said housing for filtering coarser material than silt from rainwater which passes from said inlet to said outlet, said outlet comprising an outlet entrance positioned higher than said base, for allowing rainwater to pass from said silt collection chamber to said outlet, the filter means comprising first and second filters positioned in series with each other in said flow path, said first filter being in the form of a relatively coarse grating which extends across substantially the full width of said upper housing end, and further comprising a second filter bypass means for enabling some excess water flowing from said silt collection chamber to pass to said outlet entrance without passing through said second filter, the second filter comprising a downwardly directed skirt coaxial with said outlet entrance, and said outlet comprising an outer surface coaxial with said outlet entrance, said second filter bypass means comprising an annular, passage defined radially between said downwardly directed skirt and said outlet outer surface.

15. A rainwater installation according to claim 14, further comprising a downpipe shoe connected to the downpipe lower end for producing a controlled discharge of water from the downpipe, and said housing further comprises a substantially open upper housing end defining said inlet, wherein the downpipe shoe discharges into said upper housing end, said downpipe shoe producing a controlled discharge of water onto said first filter.

16. A rainwater installation according to claim 14, wherein the downpipe lower lend is cut at an angle for producing a controlled discharge of water, and said housing further comprises a substantially open upper housing end defining said inlet, wherein the downpipe lower end discharges into said upper housing end, said downpipe lower end producing a controlled discharge of water onto said first filter.

17. A rainwater installation according to claim 14, further comprising an underground pipework for receiving rainwater, the rainwater filter assembly being fitted to filter water rainwater from the downpipe before it passes to the underground pipework.

18. A rainwater gully comprising a housing for positioning above ground level and a filter means, said housing comprising an inlet, a housing upper end and a downwardly projecting tubular outlet, said inlet extending substantially across the full width of the upper end of the housing for receiving rainwater discharging from a downpipe, the downwardly projecting tubular outlet being couplable with a substantially vertical pipe extending below ground level, and said outlet being positioned eccentric to said housing upper end, the filter means comprising first and second filters and further comprising a second filter bypass means, the second filter comprising a downwardly directed skirt coaxial with an entrance to the outlet, said outlet comprising an outer surface coaxial with said outlet entrance, said second filter bypass means comprising an annular passage defined radially between said downwardly directed skirt and said outlet outer surface.

* * * * *